United States Patent
Moser

(10) Patent No.: US 7,163,359 B2
(45) Date of Patent: Jan. 16, 2007

(54) DEVICE FOR CONVEYING POWDER AND METHOD FOR OPERATING THE SAME

(75) Inventor: Jürg Moser, Lyssach (CH)

(73) Assignee: Ramseier Technologies AG, Rubingen (CH)

( * ) Notice: Subject to any disclaimer, the term of this patent is extended or adjusted under 35 U.S.C. 154(b) by 0 days.

(21) Appl. No.: 10/489,841

(22) PCT Filed: Sep. 14, 2002

(86) PCT No.: PCT/EP02/10339

§ 371 (c)(1),
(2), (4) Date: Aug. 25, 2004

(87) PCT Pub. No.: WO03/024612

PCT Pub. Date: Mar. 27, 2003

(65) Prior Publication Data

US 2005/0019106 A1  Jan. 27, 2005

(30) Foreign Application Priority Data

Sep. 14, 2001  (DE)  ................. 101 45 448

(51) Int. Cl.
*B65G 53/00* (2006.01)
(52) U.S. Cl. .............. 406/74; 406/85; 406/98; 406/151; 417/118; 417/400
(58) Field of Classification Search .......... 406/74, 406/85, 98, 73, 151; 222/245; 417/118, 417/400, 401

See application file for complete search history.

(56) References Cited

U.S. PATENT DOCUMENTS

| | | | | |
|---|---|---|---|---|
| 2,151,514 A | | 3/1939 | Heinen ................... 214/35 |
| 2,396,524 A | * | 3/1946 | Nettel .................... 123/23 |
| 2,667,280 A | | 1/1954 | Lane et al. .............. 214/152 |
| 3,391,963 A | | 7/1968 | Weeks .................... 302/36 |
| 3,632,175 A | * | 1/1972 | Solt ....................... 406/98 |
| 3,955,853 A | * | 5/1976 | Rusterholz .............. 406/50 |
| 4,036,531 A | * | 7/1977 | Rusterholz .............. 406/50 |
| 4,405,289 A | | 9/1983 | Nakashima ............. 417/250 |
| 4,583,487 A | * | 4/1986 | Wood .................... 118/308 |
| 4,611,973 A | * | 9/1986 | Birdwell ................. 417/342 |
| 4,893,966 A | * | 1/1990 | Roehl .................... 406/127 |
| 6,287,056 B1 | * | 9/2001 | Szikszay ................ 406/197 |
| 6,478,513 B1 | * | 11/2002 | Higuchi et al. .......... 406/19 |
| 6,508,610 B1 | * | 1/2003 | Dietrich ................. 406/13 |
| 6,712,587 B1 | * | 3/2004 | Gerhardt et al. ........ 417/390 |
| 6,929,454 B1 | * | 8/2005 | Munzenmaier et al. .. 417/403 |

FOREIGN PATENT DOCUMENTS

| | | |
|---|---|---|
| DE | 1 087 520 | 8/1960 |
| DE | 0 124 933 | 4/1984 |
| DE | 24 35 912 | 7/1984 |
| DE | 101 45 448 | 6/2003 |

* cited by examiner

Primary Examiner—Joe Dillon, Jr.
(74) Attorney, Agent, or Firm—Fish & Richardson P.C.

(57) ABSTRACT

Transport system with several devices (1) for transporting powder, where each device (1) has a transfer chamber (3) into which a supply line (6) and a discharge line (8) for the powder open, and means to generate a negative pressure in the transfer chamber (3), where the means to generate a negative pressure in the device (1) has a piston (11) which is moveable in the transfer chamber.

27 Claims, 3 Drawing Sheets

DEVICE FOR CONVEYING POWDER AND METHOD FOR OPERATING THE SAME

Figure 1:
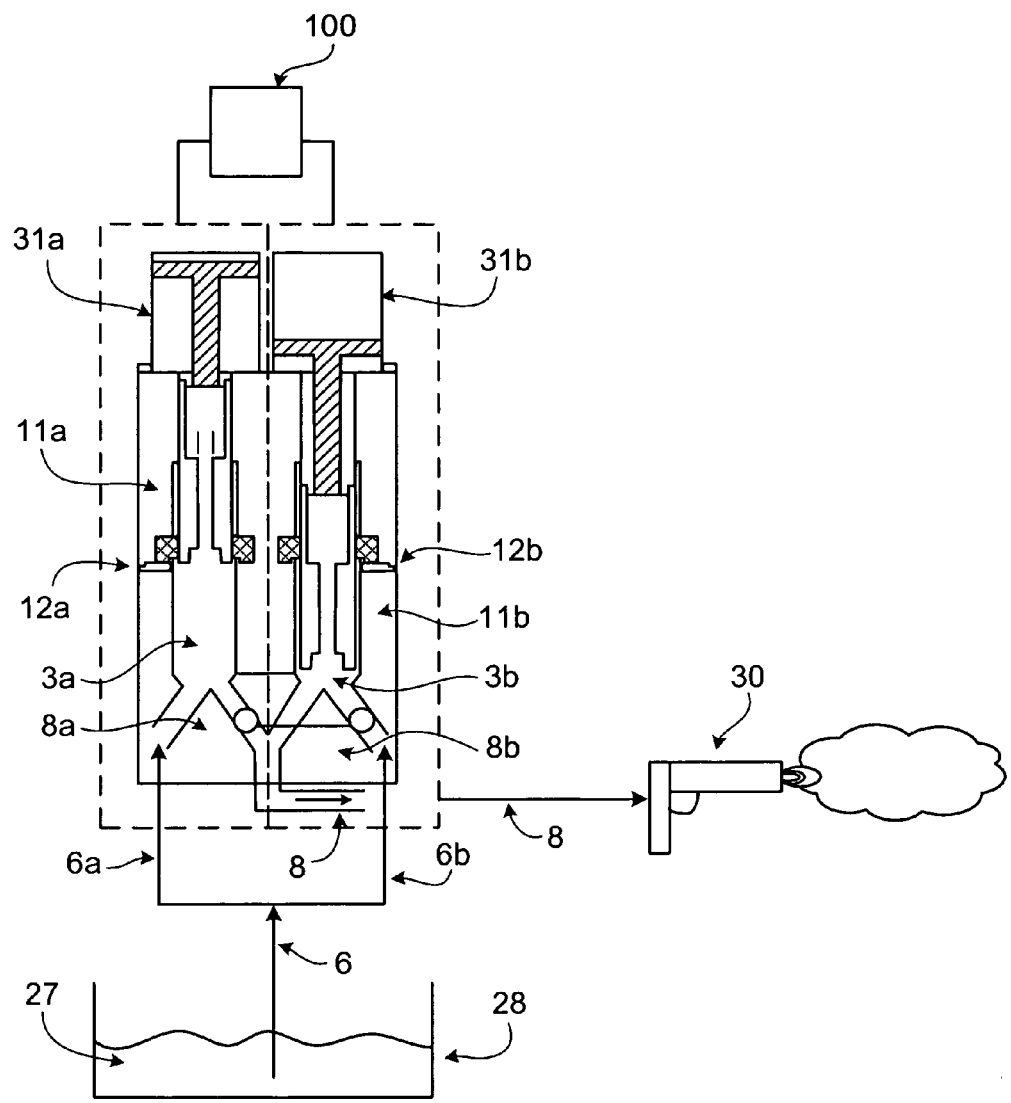

The invention relates to a transport system for transporting powder, its use and a method for transporting powder.

BACKGROUND

Numerous known devices for transporting powder operate according to the venturi principle, in which the powder is carried along by a gas stream in a nozzle. Such devices are simple in construction but they have three serious disadvantages:

First, the powder density that can be achieved in the gas stream is very low and the powder is transported by airborne entrainment, i.e. the air velocity must be greater than the suspension velocity. Second, the consistency of the quantity of powder transported is totally inadequate. Moreover, the quantity of powder is difficult to regulate. These disadvantages are especially serious when such pumps based on the venturi principle are employed to transport powder paints, since the resulting coatings demonstrate substantial fluctuations in film thickness and visual qualities.

Consequently, in the past, solutions have been sought which do not operate on the venturi principle.

A device is known from EP 1 106 547 A1 in which powder is transported pneumatically into what is termed a metering chamber. This metering chamber is connected to a suction line. The metering chamber is further connected to a pressure line, through which the powder is transported from the metering chamber into a discharge line.

In order to generate negative pressure in the suction line, this device requires an external device outside the metering chamber to generate negative pressure, for example, a vacuum pump. A control mechanism must be located between the pump and the metering chamber by which the passage for the gas can be closed off and opened. So that the powder flowing into the metering chamber cannot enter the suction line, the line is separated from the metering chamber by a gas permeable diaphragm. Depending on the makeup of the powder transported by this device, the diaphragm tends to become blocked or clogged, which naturally has a deleterious effect on the smooth operation of the device.

A second diaphragm pump for transporting powders is known from EP 0 124 933. It describes a pump having a piston which is moved up and down in a transfer chamber. The piston generates a negative pressure in the supply line on its upward path and sucks the powder out of the storage tank. Afterwards the powder is compressed in the transfer chamber by a downward movement of the piston. After the piston has reached bottom dead center, the discharge line is opened and the compressed powder is transported by means of compressed air to the application station.

In order to generate negative pressure, the piston must be sealed by a gasket, which leads to extreme wear and contamination of the moving parts. This pump generates a very inconsistent powder/air volume flow.

Furthermore, easily wettable powders, such as curable powder paints for example, easily cause blockages of the transfer chamber because of the compression prior to being transported.

This is probably the reason why this type of construction has not been accepted for the transportation of powder paints.

According to U.S. Pat. No. 3,391,963, blockage by powder of a diaphragm in a transportation device is to be prevented by moving the diaphragm back and forth by means of a piston. The diaphragm undulates, and the powder adhering thereto can be shaken off. This device operates without the provision of compressed air to the transfer chamber.

This device is expensive and susceptible to wear, since it requires a semi-permeable diaphragm. Additionally, the major part of the powder adhering is removed by the mechanical movement of the diaphragm. However, small amounts of powder remain on the surface of the diaphragm, so that clogging can be observed after an extended period of operation.

A device for pneumatically transporting bulk material is further known from DE 10 87 520 B which operates in accordance with the known dual-piston principle.

Porous inserts are similarly used with the device, separating the transport material from the operating elements of the piston system. This prevents the transport material from coming into contact with the operating elements. According to the teaching of this publication, woven materials, ceramic stone material or sintered metal can be used as porous inserts.

The critical disadvantage of this device is that when transporting fine powders, the inserts can quickly become gummed or clogged. Excessive susceptibility to wear and extremely abbreviated maintenance intervals are the consequence. Consequently, this device is also less suitable for transporting curable and fine powders, such as powder paints for example.

SUMMARY

The object of the present invention is to present a transport system for transporting powders which is simpler to operate and less prone to malfunctions and which provides consistency in flow rate considerably superior to the pumps known in the prior art.

The transport system of the present invention is to be particularly suitable for the transportation of wettable and/or curable paints without the occurrence of caking or clogging within the system.

The transport system is to be operable without an additional, external source to generate negative pressure.

The task is accomplished in accordance with the invention by a transport system having several devices (1) to transport powder, where each device (1) has a transfer chamber (3) into which a supply line (6) and a discharge line (8) for the powder open; and means to generate negative pressure in the transfer chamber (3);

and where the means to generate negative pressure in the device (1) has a moveable piston (11) in the transfer chamber.

Here and in what follows, the term "transfer chamber" is understood to mean that part of the device (1) which is accessible to the powder when the piston (11) is at top dead center (TDC).

The supply line (6) and the discharge line (8) are not included.

The piston (11) moves in the transfer chamber. This is understood to mean that the top face of the piston passes through a part of the transfer chamber during the motion of the piston. That part of the cylinder chamber which is necessary due to the construction of the piston when it is at top dead center (TDC) is connected to the upper part of the transfer chamber. This part of the cylinder chamber is not accessible to the powder to be transported.

The transport system in accordance with the invention ensures uniform transportation of large quantities of power without large quantities of transport air and high volume velocities, such as is unavoidable with transport devices which are based on the venturi principle.

This uniform transportation is demonstrated in particularly impressive fashion in long-term studies concerning flow rate: For the first time, using this pump in accordance with the invention, it is possible to achieve a maximum deviation of ±2% from the pre-set quantity of 250 g/min of powder over an operating period of 100 days.

Furthermore, the inventive solution has the advantage that it manages without a device located outside the transfer chamber to generate negative pressure. External devices to generate negative pressure are dispensed with, the powder to be transported over the supply line is moved exclusively by the motion of the piston, or more precisely, by the motion of the piston from bottom dead center (BDC) to top dead center (TDC). The means to generate negative pressure are integrated only in the device (1), i.e. in the transfer chamber (3).

The transport system in accordance with the invention, in contrast to known pumps, does not possess a diaphragm. So even when transporting extremely fine powders which are wettable or physically curable (as for example, powder paints for the painting of surfaces), no caking can be observed.

The interior of the cylinder may further have a gasket located at top dead center (TDC); in this case, the diameter of the piston is about 0.5 mm less than the bore of the interior of the cylinder. As a result of this embodiment, powder deposits on the moving parts and wear can be noticeably reduced.

DETAILED DESCRIPTION OF THE PREFERRED EMBODIMENTS

In accordance with a preferred embodiment of the present patent application, the transport system additionally has a control unit in order to ensure non-synchronous reciprocal motion of the individual pistons (11). The term "non-synchronous" is understood to mean here and in what follows that the pistons are not moving in the same direction and are not in the same place at a specific point of time of their operation.

The advantage of this embodiment is that the flow rate is improved even further over time. This is of considerable advantage, particularly for critical areas of application, as for example the supply of powder paint to the particular atomizing device (ESTA high-speed rotating bell), which can easily be seen in considerably improved flowout of the resulting cured paint films.

Furthermore, it is not necessary to fluidize the powder for the suction process, settling of the powder, which can otherwise be observed, is effectively prevented.

The discharge lines (8) of each device may be taken to individual consumption points.

In accordance with a further, similarly preferred embodiment of this application, the discharge lines (8) are taken to a common consumption point. In this way—in addition to the previously described measures—flow rate is improved once again over time.

In a further, particularly preferred embodiment of the present invention, the transport system has two devices (1).

This embodiment represents, according to previous findings, an optimum in consistent flow rate with respect to an embodiment of the present invention which is as simple and low-cost as possible.

The present invention also preferably relates to those transport systems whose devices (1) additionally have a passage (12) to supply compressed gas to the transfer chamber (3).

Extremely critical powders, which have previously resulted in clogging or caking in mechanically operated powder pumps, can thereby be transported for the first time. Examples of such critical powders are acrylic-based powder paints to which an additional flowout agent is added.

In accordance with this embodiment, such previously difficult-to-transport powders can be transported and/or metered easily.

A particularly preferred transport system under the invention is one in which the passage (12) opens into the transfer chamber (3) above bottom dead center (BDC) for the piston (11).

The least aggressive air distribution possible in the transfer chamber is achieved in this manner.

In accordance with a preferred embodiment of the invention under the present patent application, the passage (12) opens into a circumferential groove with an opening to the transfer chamber (3).

This embodiment ensures particularly uniform distribution of air. As a result of the circumferential groove, a special cleaning step for the transfer chamber can be carried out as effectively as possible. Only compressed air at twice the pressure used for normal transport needs to be introduced into the transfer chamber through the existing devices. Generally, the pressure of the air supplied is 3 bar. Compressed air pressure is increased to 6 bar for the cleaning step. In this way, effective cleaning of the transfer chamber (3) is guaranteed through the circumferential groove with an opening to the transfer chamber (3).

For the first time, it is possible to change different powders rapidly with the device in accordance with the invention, without the necessity for manually cleaning the transport system under the invention. The groove itself is also thoroughly cleaned through the circulation opening to the transfer chamber. After a cleaning operation, no powder residue remains in the groove. Changing different colors is of extreme interest, especially in the painting of surfaces using powder paints: Color changes can be performed considerably more quickly; the previously habitual color discrepancies resulting from contaminants vanish completely when the transport system under the invention is used.

In a further preferred embodiment of the present invention, the circumferential groove has a width of 0.05 to 1 mm.

This groove width represents an optimum between adequate width through which the necessary quantity of air for particularly critical powders can be continuously supplied to the transfer chamber and not too great width which would encourage clogging of the groove with the powder being transported.

In accordance with a further, similarly preferred embodiment of this patent application, the lower part (3a) of the transfer chamber (3), the supply line (6) and the discharge line (8) are made of the same material. Specifically they represent a replaceable unit.

The particular advantage is the ease of service and the simplicity of this embodiment.

The present invention also preferably relates to a transport system in which at least one of the discharge lines (8) has an inside diameter of less than 8 mm, in particular less than 6.5 mm.

This embodiment is of special advantage when the end consumer exerts very little counterpressure on the powder stream being transported in the discharge line (8). The inside diameter, which is very small by comparison with supply and discharge lines otherwise used, builds up such a counterpressure that an even more uniform volume flow can be achieved than with larger diameters. Pulsing of the powder/air stream, which is associated with blemishes in the visual quality of the paint finishes obtained, particularly with powder painting, is thereby prevented.

In an equally preferred transport system of the present invention, at least one of the discharge lines (8) has a length of at least 5 meters, specifically of at least 10 meters.

This minimum length builds up the counterpressure necessary to prevent residual pulsing. In contrast to pumps of the prior art, the longer the discharge line, the better the transport system of the present invention is. Optimal transportation is still ensured, even with a length of 100 meters.

In accordance with a further, equally preferred embodiment in accordance with the present application, the piston (11) is connected to the drive unit (31) through a decoupling element (32).

In this way, extremely simple drive units can be utilized to drive the piston, for example, simple pneumatically powered compressed air cylinders. These commercially available compressed air cylinders have lateral play on account of their construction. This lateral play prevents a piston (11) rigidly connected to a drive unit of this kind from being guided precisely. These tolerances would cause clogging on the side walls of the transfer chamber in the area between top dead center (TDC) and bottom dead center (BDC). Furthermore, the consequence of this lateral play would be a clearly shorter service life for existing sealing elements.

The additional decoupling element is rigidly connected both to the drive unit and to the piston in the upward and downward direction. However, through normal measures known to the person skilled in the art, it exhibits lateral play which balances out the truly undesirable lateral play. This embodiment ensures that the piston is guided accurately.

It is also possible to dispense completely with the previously described decoupling element (32). In this similarly preferred embodiment of the invention, the piston (11) is connected directly to the drive unit (31). It is thus possible that the entire circumference of the piston (11) runs in the guide sleeve.

In accordance with a further, similarly preferred embodiment of this application, the inside diameter of the transfer chamber in the area between top dead center (TDC) and bottom dead center (BDC) of the piston (11) has a diameter 0.2 to 0.8 mm larger than the outside diameter of the piston (11). In this embodiment, there is a laminar flow of air into the transfer chamber; at the same time, this prevents contamination of the inner wall of the cylinder.

In a further preferred embodiment of the present invention, dead volume, with the valve closed and the piston at bottom dead center is less than 1/10th, specifically less than 1/50th, of the volume of the entire transfer chamber.

Reducing dead volume is particularly important when fluctuations of less than 2% in the air/powder stream transported must be guaranteed over a long period.

Normally a device (1) for the transport system in accordance with the invention has a volume in the transfer chamber between 15 and 40 ml. A dead volume of less than 1 ml absolute shows clear improvements in the consistency of the flow rate.

In practice, the simplest way to reduce dead volume is to locate the valves for the supply line (6) and the discharge line (8) as close as possible to the transfer chamber (3).

In order to accomplish its objective, the present invention further relates to a method to transport powder by means of a device which has a transfer chamber (3) into which the supply line (6) and a discharge line (8) for the powder open; a piston (11) to generate negative pressure in the transfer chamber (3); and a passage (12) to supply compressed gas to the transfer chamber (3), where, from its initial position, the piston (11) sucks powder into the transfer chamber by its motion, then compressed gas is brought into the transfer chamber (3) and afterwards the piston (11) returns to its initial position.

This method in accordance with the invention, just like the previously described transport system, ensures uniform transportation of large quantities of powder without large quantities of transport air and high volume velocities, which are unavoidable, for example, with transport devices based on the venturi principle.

This uniform transportation manifests itself in particularly impressive fashion in long-term studies regarding flow rate: With the method in accordance with the invention it is possible to achieve a maximum deviation of ±2% of the preset flow rate of 250 g/min of powder over an operating period of 100 days. Furthermore, the way the the object is achieved in accordance with the invention has the advantage that it does so without an apparatus located outside the transfer chamber to generate negative pressure. External devices to generate negative pressure are thus dispensed with, the powder to be transported through the supply line is carried exclusively by piston motion, more precisely, by the movement of the piston from bottom dead center (BDC) to top dead center (TDC). The means to generate negative pressure are integrated in the device (1), i.e. in the transfer chamber (3). The method under the invention does not require a diaphragm to generate negative pressure.

By supplying compressed gas, it is possible for the first time to transport extremely critical powders which previously resulted in clogging or caking in other powder pumps from the prior art. Critical powders of this type are, for example, acrylic-based powder paints to which an additional flowout agent is added.

In a similarly preferred embodiment of the method under the invention, the closing of the supply line (6) and the opening of the discharge line (8) do not occur simultaneously. Specifically, the supply line is closed first and then the discharge line is opened.

In accordance with a simple implementation of this feature of the method, the supply line (6) and the discharge line (8) are made from an elastomer material. A divider separates the two hoses, and the two hoses are run in parallel in an area where they are closed off. Two rods disposed parallel to each other are moved by a mechanical drive in a direction perpendicular to the divider and to the direction of the hoses. As a result of this movement, the first rod moves away from the first hose, the second rod moves toward the second hose and constricts it. Thus, the first line hose is opened and the second hose is closed. When the mechanical drive is moved in the opposite direction, the first hose is opened and the second line is closed. To ensure a time delay in the opening and closing of the two hoses, the two rods are aligned parallel to each other but at an angle to the divider. To achieve an even longer time delay, it is advantageous if the sectional plane running perpendicular through both hoses during the close-off process forms an angle of more than 30° with the axis formed by the movement of the rods. A closing and opening device of this type for opening and closing the supply line (6) and the discharge line (8) at different times is shown schematically in FIG. 3.

In accordance with a further, equally preferred embodiment of the method under the invention, the downward speed of the piston (11) is not constant. Specifically, the downward speed is slowed when approaching bottom dead center (BDC).

Uniform transportation of the powder is thereby improved once again. The downward speed of the piston (11) is controlled by the compressed air.

In a further preferred embodiment of the present invention, the flow rate of powder is adjusted through the stroke of the cylinder.

This represents a simple method of presetting the quantity of powder to be transported.

The present invention preferably also relates to a method in which the flow rate of powder is adjusted through the frequency of the cylinder stroke.

This adjustment represents a simple and effective possible way of precisely adjusting the quantity of powder to be transported. It is possible to make this simple adjustment by controlling stroke frequency electronically.

An equally preferred embodiment of the present method provides for halting the introduction of compressed air before closing the discharge and supply line.

In accordance with a preferred embodiment of the invention in the present patent application, the introduction of compressed air is halted before closing the discharge and supply line.

This ensures that no transport air enters the supply line.

In accordance with a further, similarly preferred embodiment of the method in accordance with the invention

- the discharge line (8) is closed when the piston (11) has reached top dead center (TDC) in its stroke;
- then the supply line (6) is closed;
- after a waiting period of at least 15 ms, compressed air is introduced into the transfer chamber (3);
- after a waiting period of at least 110 ms, the piston (11) is moved downward by the admission of compressed air;
- the admission of compressed air ceases at the latest 20 ms before reaching bottom dead center; and
- afterwards the discharge line is closed.

This procedure represents an optimized cycle which is suitable for general use with most powders to be transported and which ensures uniform transportation without fluctuations and without clogging or caking in the transfer chamber (3).

In a further preferred embodiment of the present invention, a cleaning program is run between periods of continuous operation in which compressed air is introduced

- into the transfer chamber (3) at least four times, with a duration each time of at least 2.5 secs; and aftewards
- into the transfer chamber (3) at least once, with a duration of at least 6 secs.

The pressure of the compressed air introduced is about 6 bar. With this rate of pulsing, the introduction of air generally lasts longer than the interruption.

The device and the method in accordance with the invention have an application in industrial powder coating in particular. The transport system in accordance with the invention is especially suitable for use in the automobile industry for the application of clear coats and colored base coats.

BRIEF DESCRIPTION OF THE DRAWINGS

The following descriptions of the figures and schematic explain the invention, without in any way restricting the invention to them.

FIG. 1 shows a system in accordance with the invention for transporting a powder (27) from a powder storage tank (28) with the assistance of a transport system (29) to an application station (30), where a powder gun is being used in this example for the application.

The transport system (29) consists in this example of two devices, identically constructed but operated in opposite directions (1*a*) and (1*b*). Obviously the transport system (29) can have more than two devices (1*a*), (1*b*), depending on the quantities of powder which have to be transported to the application station and to what degree this must be pulse-free.

The powder (27) is transported over a common supply line (6*a*), (6*b*) which divides into supply lines (6*a*) and (6*b*). Both supply lines (6*a*), (6*b*) open into their own transfer chamber (3*a*), (3*b*). Shut-off mechanisms (7*a*), (7*b*) are located in each supply line (6*a*), (6*b*).

From the transfer chambers (3*a*), (3*b*), the powder passes through discharge lines (8*a*), (8*b*) into the common discharge line (8) leading to the application station (30). Shut-off valves (9*a*), (9*b*) are also located here in the two discharge lines (8*a*), (8*b*).

FIG. 1 also shows drive units (31*a*), (31*b*) to which the piston is connected through decoupling elements (32*a*), (32*b*). The left piston (11*a*) is furthermore positioned at top dead center. The passage (12) through which compressed air is supplied to the transfer chamber (3*a*) is shown below top dead center (TDC).

A special embodiment of a device (1), which can also be used in the transport system under the invention, is explained in more detail by way of example with reference to the appended FIG. 2. FIG. 2 shows a longitudinal section through a schematic representation of a device for transporting powder.

The device (1) has a transfer chamber (3) in a base (2), with an inlet port (4) and an outlet port (6) opening into said chamber. Attached to the inlet port (4) is a supply line (6) which can be closed off and opened under the control of a shut-off mechanism (9). The base (2) is connected to a guide housing (10) in which a piston (11) is located so as to be moveable reciprocally. The suction piston (11) has an axial passage (14) and is furnished at the end facing the transfer chamber with a diffuser (13) which restricts passages between itself and the piston (11), said passages serving to supply a compressed gas to the transfer chamber (3). A gasket (15) seals the guide housing (10) both to the piston (11) and to the base (2). At the end facing away from the transfer chamber (3), the suction piston (11) is connected to a drive device (16).

The drive device (16) is configured in the present example as a piston-cylinder unit powered by pressure means. It could also be configured as a mechanical drive unit, for example, as an eccentric drive or crank drive or as an electromagnetic drive unit. The piston (18) of the drive device (16), which can be moved in a cylinder (17) by pressure means, air for example, has a hollow connecting rod (19) which is connected at its (in the drawing) lower end to a piston (11). A line (26), configured as a hose, which is connected to a valve (25) and whose function is explained further below, is attached at the other end of the connecting rod (19). An upper pressure line (20) and a lower pressure line (21) serve to apply pressure means, air for example, to the piston (18) to move the piston up and down in the cylinder (17). The pressure lines (20) and (21) are connected to a two-way valve (22) which, in turn, is attached to a pressure source (23). Depending on the position of the two-way valve (22), one of the two pressure lines (20) or (21) has pressure applied, while the other one is connected to a vent (24).

Figure 2:
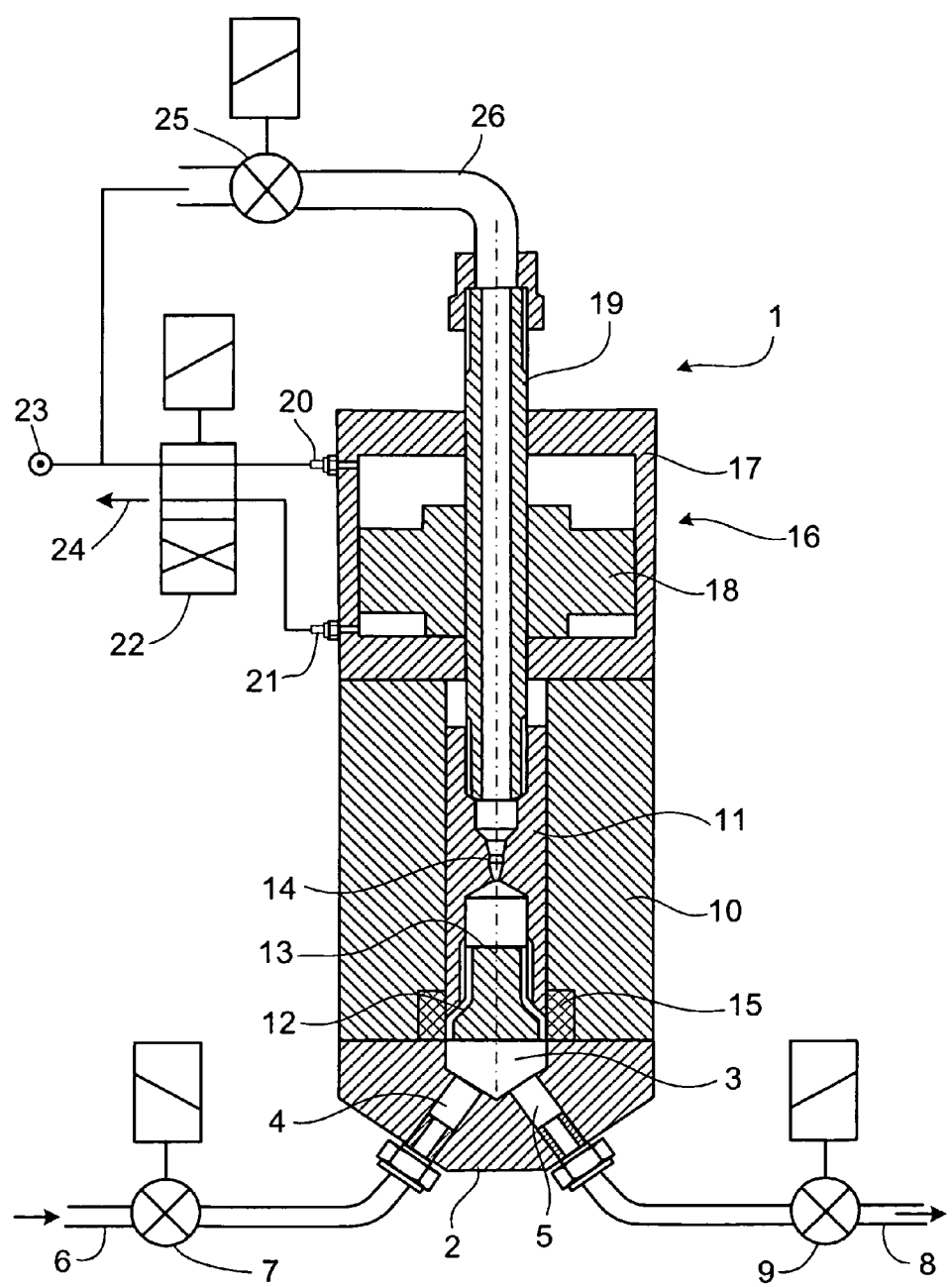

The operation of the device described above will be explained in what follows. Starting from the position shown in FIG. 2, the piston (11) is moved away from the transfer chamber (3) by the drive unit (15). The shut-off mechanism (9) in the discharge line (8) is closed at this point. As a result of this motion of the suction piston, negative pressure is created in the transfer chamber (3). At the same time, the shut-off mechanism (7) in the supply line (6) is opened, so that powder flows out of a powder supply tank (not shown) into the transfer chamber (3). The powder in the supply line (7) can already be dispersed in a gas or gas mixture so that it is especially free-flowing. In most cases this gas mixture will be air. However, in the case of sensitive powdery materials, for example those that react or crosslink in an undesirable fashion with oxygen, another gas or gas mixture, for example an inert gas, can be used. After sufficient powder has flowed into the transfer chamber (3), the shut-off mechanism (7) in the supply line (6) is closed. By opening the valve (25), compressed gas, which may come from the same source as that used to operate the drive device (16), is induced to flow through the line (26), the connecting rod (19) and the axial passage (14) in the suction piston (11). At the same time, the shut-off mechanism (9) in the discharge line (8) is opened so that the powder present in the transfer chamber (3) is forced out through the discharge line (8). This ejection of the powder by means of compressed gas can occur before the piston (11) has reached its final position where it is farthest removed from the transfer chamber (3). This allows the powder transported through the device to be metered precisely. After the suction piston (11) has returned to its initial position shown in the figure, a new transport cycle can begin.

Figure 3:
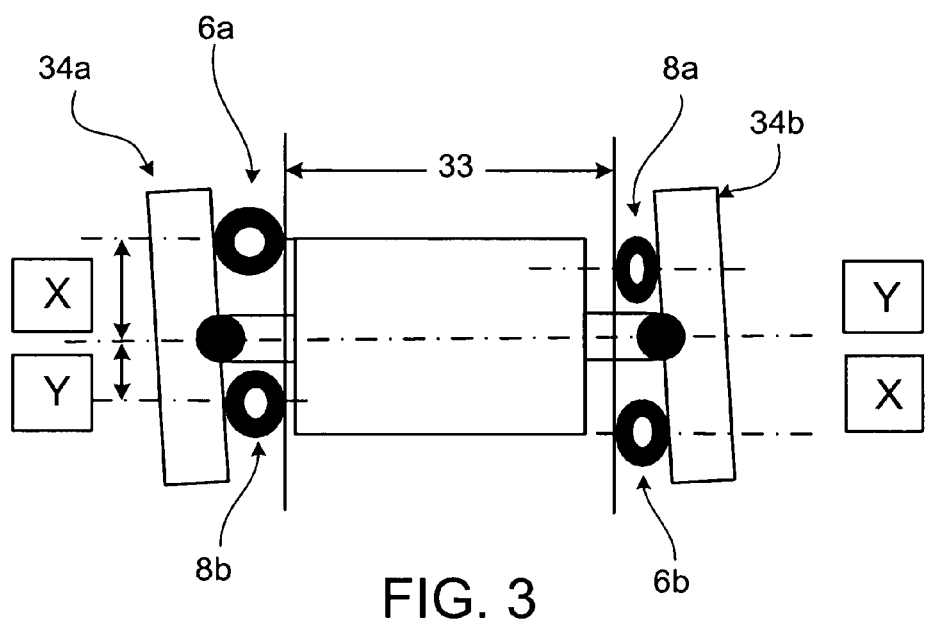

FIG. 3 shows a closing and opening device for opening and closing the supply line (6) and the discharge line (8) at different times:

FIG. 3 shows a section in the area of the supply lines (6a), (6b) and discharge line (8a), (8b). The sectional plane runs perpendicular to these lines. A suitable motion device is located between the dividers (33) to ensure corresponding motion of the rods (34a), (34b). In this case, the device for moving the two rods is an oversquare cylinder. In this figure the different distances between the axes perpendicular to the dividers (33) are identified by X and Y. The axes run through the center of the hoses and indicate the asymmetry.

The rods (34a), (34b) do not run parallel to the dividers. This angled position and the motion of the oversquare cylinder ensures the opening and closing times of the supply and discharge lines do not overlap. Varying time differences can be preset by a different adjustment angle of the rods (34a), (34b).

LIST OF REFERANCE NUMBERS

1 Device 18 Piston
2 Base 19 Connecting rod
3 Transfer chamber 20 Upper pressure line
4 Inlet port 21 Lower pressure line
5 Outlet port 22 Two-way valve
6 Supply line 23 Pressure source
7 Shut-off mechanism 24 Vent
8 Discharge line 25 Valve
9 Shut-off mechanism 26 Line (hose)
10 Guide housing 27 Powder
11 Piston 28 Powder storage tank
12 Passage 29 Transport system
13 Diffuser 30 Application station
14 Axial Passage 31 Drive unit
15 Gasket 32 Decoupling unit
16 Drive device 33 Divider
17 Cylinder 34 Rod
100 Control Unit

What is claimed is:

1. Transport system with several devices to transfer powder, where each device has:
   a transfer chamber into which a supply line and a discharge line for the powder open; and
   means to generate negative pressure in the transfer chamber;
   wherein the means to generate negative pressure in the device has a piston which is moveable in the transfer chamber, that the transport system does not have a diaphragm and that the discharge lines are taken to a common consumption point.

2. Transport system in accordance with claim 1, wherein it additionally has a control unit to ensure non-synchronous reciprocal movement of the individual pistons.

3. Transport system in accordance with claim 1, wherein it has two devices.

4. Transport system in accordance with claim 1, wherein it additionally has a passage to supply compressed gas to the transfer chamber.

5. Transport system in accordance with claim 4, wherein the passage opens into the transfer chamber above bottom dead center for the piston.

6. Transport system in accordance with claim 4, wherein the passage opens into a circumferential groove with opening to the transfer chamber.

7. Transport system in accordance with claim 6, wherein the circumferential groove has a width of 0.05 to 1 mm.

8. Transport system in accordance with claim 1, wherein the lower part of the transfer chamber, the supply line and the discharge line are made from the same material and represent a replaceable unit.

9. Transport system in accordance with claim 1, wherein at least one of the discharge lines has an internal diameter of less than 8.

10. Transport system in accordance with claim 1, wherein at least one of the discharge lines has a length of at least 5 meters.

11. Transport system in accordance with claim 1, wherein the piston is connected through a decoupling element to a drive unit.

12. Transport system in accordance with claim 1, wherein the piston is directly connected to a drive unit.

13. Transport system in accordance with claim 1, wherein the transfer chamber in the area between top dead center and bottom dead center of the piston has an inside diameter 0.2 to 0.8 mm larger than the outside diameter of the piston.

14. Transport system in accordance with claim 1, wherein dead volume with the valve closed and the piston at bottom dead center measures less than $\frac{1}{10}$th of the volume of the entire transfer chamber.

15. Transport system in accordance with claim 4, wherein the lower part of the transfer chamber, the supply line and the discharge line are made from the same material and represent a replaceable unit.

16. Transport system in accordance with claim 4, wherein at least one of the discharge lines has an internal diameter of less than 8.

17. Transport system in accordance with claim 4, wherein at least one of the discharge lines has a length of at least 5 meters.

18. Transport system in accordance with claim 4, wherein the piston is connected through a decoupling element to a drive unit.

19. Transport system in accordance with claim 4, wherein the piston is directly connected to a drive unit.

20. Transport system in accordance with claim 4, wherein the transfer chamber in the area between top dead center and bottom dead center of the piston has an inside diameter 0.2 to 0.8 mm larger than the outside diameter of the piston.

21. Transport system in accordance with claim 4, wherein dead volume with the valve closed and the piston at bottom dead center measures less than 1/10th of the volume of the entire transfer chamber.

22. Transport system in accordance with claim 1, wherein at least one of the discharge lines has an internal diameter of than 6.5 mm.

23. Transport system in accordance with claim 1, wherein at least one of the discharge lines has a length of at least 10 meters.

24. Transport system in accordance with claim 1, wherein dead volume with the valve closed and the piston dead center measures less than 1/50th of the volume of the entire transfer chamber.

25. Transport system in accordance with claim 4, wherein at least one of the discharge lines has an internal diameter of less than 6.5 mm.

26. Transport system in accordance with claim 4, wherein at least one of the discharge lines has a length of at least 10 meters.

27. Transport system in accordance with claim 4, wherein dead volume with the valve closed and the piston dead center measures less than 1/50th of the entire transfer chamber.

* * * * *